(12) United States Patent
Greve

(10) Patent No.: US 8,657,366 B2
(45) Date of Patent: Feb. 25, 2014

(54) PANEL TO PANEL BONDING USING A BRANCHED CHANNEL

(75) Inventor: Bruce N. Greve, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/528,259

(22) Filed: Jun. 20, 2012

(65) Prior Publication Data
US 2013/0341967 A1 Dec. 26, 2013

(51) Int. Cl.
*B60R 13/04* (2006.01)

(52) U.S. Cl.
USPC .................. 296/191; 296/29; 296/901.01

(58) Field of Classification Search
USPC ......... 296/191, 901.01, 187.02, 29; 29/281.1, 29/281.5; 156/257
See application file for complete search history.

(56) References Cited

U.S. PATENT DOCUMENTS

| | | | |
|---|---|---|---|
| 3,996,082 A | 12/1976 | Leatherman | |
| 4,029,837 A | 6/1977 | Leatherman | |
| 4,822,098 A * | 4/1989 | Vogt et al. | 296/146.5 |
| 4,912,826 A * | 4/1990 | Dixon et al. | 29/281.1 |
| 5,786,067 A | 7/1998 | Gold | |
| 7,527,705 B2 | 5/2009 | Hengel et al. | |
| 7,811,405 B2 * | 10/2010 | Basu et al. | 156/276 |
| 8,088,242 B2 | 1/2012 | Frisch et al. | |
| 8,101,036 B2 | 1/2012 | Schroeder et al. | |
| 2004/0031558 A1 | 2/2004 | Johnck | |
| 2011/0037293 A1 * | 2/2011 | Kralevich et al. | 296/198 |
| 2011/0158741 A1 | 6/2011 | Knaebel | |

* cited by examiner

*Primary Examiner* — Glenn Dayoan
*Assistant Examiner* — Pinel Romain
(74) *Attorney, Agent, or Firm* — Dinsmore & Shohl LLP

(57) ABSTRACT

A panel, a panel assembly having an adhesive bond and a method of adhesively bonding the panel assembly. The panel assembly includes a first panel and a second panel and at least one main adhesive channel formed in at least one of the first and second panels. At least one branched adhesive channel in fluid communication with the at least one main adhesive channel and an adhesive for joining the first and second panels to form an adhesive bond therebetween. By such structure, the placement of an adhesive into the main adhesive channel and subsequent joining of the first and second panels, any excess adhesive flows into the branched adhesive channel to avoid an over-filling or under-filling situation in the main adhesive channel.

18 Claims, 2 Drawing Sheets

PANEL TO PANEL BONDING USING A BRANCHED CHANNEL

TECHNICAL FIELD

The present invention relates generally to a panel, a panel assembly having an adhesive bond and a method of adhesively bonding such an assembly, and more particularly, to improve the strength of an adhesively bonded panel assembly, improve bond joint quality and robustness, reduce warranty and improve surface appearance due to under/overfilling of adhesive to the panel assembly.

BACKGROUND

Automotive vehicle body structures often include assemblies such as spoilers, closure panels, fenders, and the like that have complementary inner and outer panels that are joined at peripheral surfaces. In one joining approach, one or both of the panels to be joined has an adhesive channel formed in it to promote the delivery of an adhesive. When bonding such automotive structures, an undesirable appearance known as a bond-line read through can occur when the thickness or width of the adhesive joint is too large. A continuing difficulty arises in that when bonding the inner and outer panel members together over-filling or under-filling the adhesive channel results in reduced bond strength or appearance defects.

Another bonding method exists wherein neither joined surface includes an adhesive channel. In this configuration, a free standing adhesive bead is dispensed directly onto a flat surface of one of the panels. With this and other bonding methods, great care and precision must be exercised to avoid the appearance defects that are caused by the shrinkage of the adhesive during curing. Such additional effort is time consuming and expensive. Thus, the avoidance or repair of such defects has been a continuing problem for automotive manufacturers.

There remains a need to address the adhesive bonding of plastic panels or other parts having surface appearance requirements in order to improve bond joint quality and robustness.

SUMMARY

Against the above background, the present invention is directed to improve the strength of an adhesively bonded panel assembly, to improve bond joint quality and robustness, to reduce warranty and to improve quality in a panel assembly and a method of adhesively bonding such an assembly.

In one embodiment, an automotive panel may comprise at least one main adhesive channel defined therein; and at least one branched adhesive channel in fluid communication with the at least one main adhesive channel. By such structure, the placement of an adhesive into the main adhesive channel and subsequent joining of the panel to another structure (for example, another panel), any excess adhesive flows into the branched adhesive channel to avoid an over-filling or under-filling situation in the main adhesive channel.

In another embodiment, an automotive panel assembly may comprise a first panel and a second panel; at least one main adhesive channel formed in at least one of the first and second panels; at least one branched adhesive channel in fluid communication with the at least one main adhesive channel; and an adhesive for joining the first and second panels to form an adhesive bond therebetween. By such structure, the placement of an adhesive into the main adhesive channel and subsequent joining of the first and second panels, any excess adhesive flows into the branched adhesive channel to avoid an over-filling or under-filling situation in the main adhesive channel.

In yet a further embodiment, a method of adhesively bonding an automotive panel assembly may comprise providing a first panel and a second panel. At least one of the first and second panels may comprise at least one main adhesive channel and at least one branched adhesive channel formed therein, wherein the at least one branched adhesive channel is in fluid communication with the at least one main adhesive channel to act as an overflow outlet. Inserting an adhesive into the at least one main adhesive channel and pressing the first and second panels together to form an adhesive bond such that any excess of the adhesive flows from the at least one main adhesive channel to the overflow outlet.

These and other features, aspects, and advantages of the present invention will become better understood with reference to the following description and the appended claims.

BRIEF DESCRIPTION OF THE DRAWINGS

Though the specification concludes with claims particularly pointing out and distinctly claiming the invention, it is believed that the present invention will be better understood from the following description taken in conjunction with the accompanying drawings, in which:

DETAILED DESCRIPTION

Features and advantages of the invention will now be described with occasional reference to specific embodiments. However, the invention may be embodied in different forms and should not be construed as limited to the embodiments set forth herein. Rather, these embodiments are provided so that this disclosure will be thorough and complete and will fully convey the scope of the invention to those skilled in the art.

Unless otherwise defined, all technical terms used herein have the same meaning as commonly understood by one of ordinary skill in the art to which the invention belongs. The terminology used in the description herein is for describing particular embodiments only and is not intended to be limiting. As used in the specification and appended claims, the singular forms "a," "an," and "the" are intended to include the plural forms as well, unless the context clearly indicates otherwise.

Figure 1A:
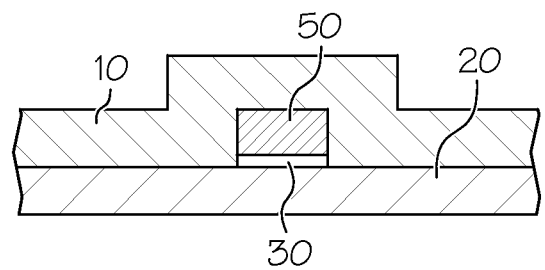
FIGS. 1A and 1B is an illustration of an under- and over-fill of an adhesive channel according to the prior art.
Figure 1B:
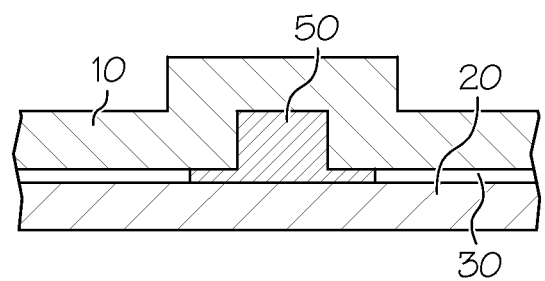

Prior art approaches have included bonding two panels together having an adhesive channel formed in one of the panels to promote the delivery of an adhesive. Referring first to FIGS. 1A and 1B, the bonding of two panels 10, 20 together with an adhesive channel 30 formed in one of the panels 10, 20 is shown. FIG. 1A depicts an under-filling of the adhesive channel 30 which results in low bond strength; and, FIG. 1B depicts an over-filling of the adhesive channel 30 which results in distortions of the outer panel 20. As one skilled in the art would recognize that dispensing the correct amount of adhesive into one of the panels via an adhesive channel is difficult thus resulting in appearance defects and low bond joint quality and robustness. Thus, according to the present invention, a panel, a panel assembly and a method of adhesively bonding such an assembly overcomes the deficiencies described in FIGS. 1A and 1B.

Figure 2A:
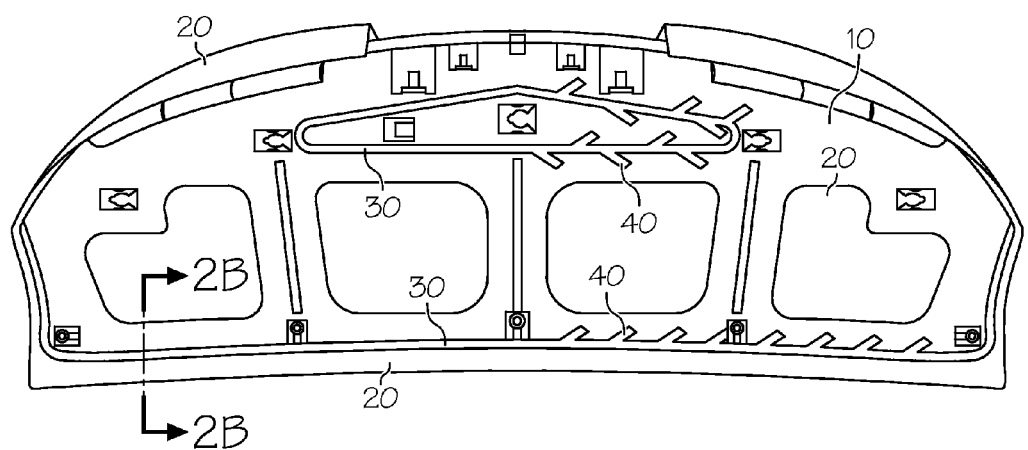
FIG. 2A illustrates a cross sectional view of the panel assembly according to an aspect of the present invention.

FIG. 2A shows one embodiment of a two panel assembly according to the present invention. The panel assembly comprises an inner panel 10 and an outer panel 20, at least one main channel 30 formed in at least one panel 10, 20, as well as at least one modified branched channel 40 and an adhesive 50.

Figure 2B:
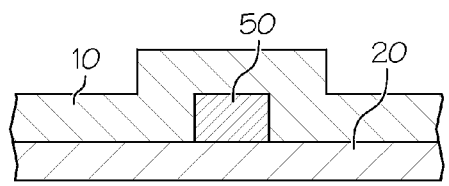
FIG. 2B shows a partial cross sectional view of the panel assembly of FIG. 2A according to an aspect of the present invention.

FIG. 2B highlights a partial cross sectional view of the channel 30, shown in FIG. 2A between the arrowed lines labeled as 2B, wherein the panel, the panel assembly having an adhesive bond and method of adhesively bonding such an assembly of the present invention is shown to overcome the under- or over-filling of the main channel 30, thus, not contributing to the aforementioned appearance defects and low bond joint quality and robustness as indicated in the prior art.

Figure 3:
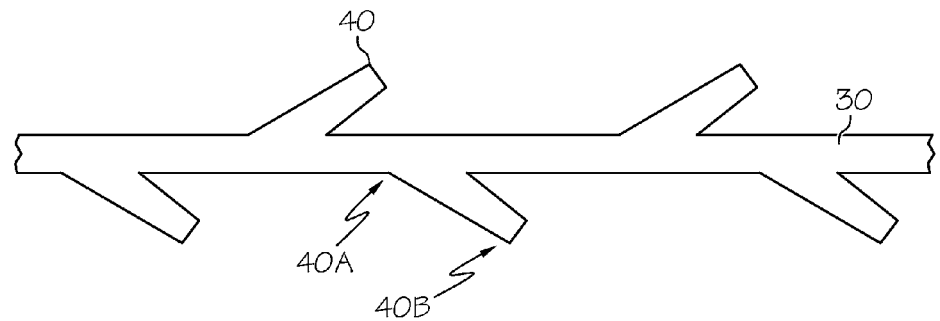
FIG. 3 shows a partial view of an adhesive channel of FIG. 2A according to an aspect of the present invention.

FIG. 3 highlights a partial view of the main channel 30 and the numerous modified branched channels 40 of FIG. 2A. The modified branched channels 40 are tapered in the depth dimension so that they are wider at the entrance 40A adjacent the main channel 30 than at the remote end 40B.

Improved adhesive bonding of panels or other parts having surface appearance requirements as well as improved bond joint quality or robustness can be achieved by the panel, panel assembly and method of adhesively bonding a panel assembly according to the present invention. The panel assembly and method of adhesively bonding a panel assembly can be achieved by bonding the inner panel 10 and outer panel 20 to one another. In a preferred form, one of the panels 10, 20 is a substrate, work piece or the like for automotive vehicle body structures, while the outer panel 20, being visible to an observer when placed on a vehicle. Wherein one of the inner and outer panels 10, 20 defines a first and second panel.

At least one channel 30 is formed to at least one of the panels 10, 20 which defines the dimensions of the bond joint and helps control and minimize surface defects. Each of the channels 30, also referred to as an adhesive channel or main channel, is part of the tooling and is created at the time the panels 10, 20 are molded. The channels 30 include a bonding area that extends substantially throughout the length and width of the inner and outer panels 10, 20. The width dimension of each of the channels 30 is kept as small as possible to avoid subsequent appearance defects such as the aforementioned bond-line read through. The channels 30 traverse a substantial majority of at least one of the length and width of the panels 10, 20. Wherein the substantial majority is less than about 50%, or less than about 60%, or less than about 70%, or less than about 80%, or less than about 90%. As the width of the channels 30 decrease, the overall strength of the joint decreases because there is less surface area of bond.

Therefore, in accordance with the present invention, a plurality of branched channels 40 are added to at least one of the channels 30 in order to increase the surface area of the bond, add strength to the bond joint and provide a greater latitude in the adhesive dispense process known to one skilled in the art.

One skilled in the art will appreciate that the panel tooling is modified in the present invention by adding overflow channels or a plurality of short side branched channels 40, also referred to as a modified branched channel or overflow outlets for excess adhesive, to each of the channels 30. The side branched channels 40, in conjunction with the each of the channels 30, define a conically herringbone shaped adhesive flow path. The plurality of branched channels 40 allows an ample amount of adhesive 50 known to one skilled in the art to be dispensed into each of the channels 30 thus eliminating excess adhesive 50 to form in each of each of the channels 30 which causes over- or under-filling of each of the main channels 30. Thus, the branched channels 40 are in fluid communication with the channels 30. The plurality of branched channels 40 are formed to be spaced sequentially along a linear dimension of at least one channel 30. Also, a plurality of branched channels 40 are formed to be angled sequentially along a linear dimension of at least one channel 30.

The number of branched channels 40 and the spacing between each of the branched channels 40 along the linear dimension of the at least one channel 30 is determined based on the targeted volume of adhesive 50 dispensed as well as the final bond area. The distance between each of the plurality of branched channels 40 is no less than two times the width and no more than five times the width of the channel 30. Further, although shown being angled relative to the main channel 30, it will be appreciated by those skilled in the art to have the branch channels 40 be perpendicular to the main channel 30, or at any angle. The direction of the plurality of branch channels 40 away from the main channels 30 are dictated by local design features or space available in the bonding flanges. There is typically between about 25 to about 30 mm of contact between the inner and outer panels 10, 20 in the bond flange area. Thus, the branched channels 40 must be placed within the bond flange area which may require an acute angle of departure from the channels 30.

In one embodiment, the panel assembly and method provides inserting the adhesive 50, applied in liquid form, to at least one panel 10, 20 and ultimately into each of the channels 30 that are formed in the panels 10, 20, wherein the excess built up adhesive 50 in the channel 30 is diverted into one or more of the modified branched channels 40 as the panels 10, 20 are pressed together in a bonding fixture. The panel assembly and method of adhesively bonding a panel assembly allows for greater tolerance and provides an increase in the bonding area resulting in greater separation force while avoiding outer panel distortion. This promotes a more exact filling of each of the channels 30 with the adhesive 50 which is important to bond performance.

In a further embodiment, the panel assembly and method of adhesively bonding a panel assembly comprising providing an inner panel 10 and an outer panel 20 wherein at least one inner or outer panel 10, 20 comprises at least one channel 30 for receiving an adhesive 50 and at least one modified branched channel 40 in fluid communication with each of the channels 30 and acts as an overflow outlet for the adhesive. Applying the adhesive 50 in thixotropic liquid form into at least one panel 10, 20 wherein the adhesive 50 is dispensed into each of the channels 30 and the panels 10, 20 are then pressed together in a bonding fixture. Any overflow of adhesive 50 from the channels 30 flows into each of the branched channels 40 to form an adhesive bond.

In yet a further embodiment, the panel assembly and method of adhesively bonding the panel assembly provides the panel 10 with at least one channel 30, each channel 30 containing modified branched channels 40 in fluid communication with each channel 30 in order to divert excess adhesive 50 into the modified branched channels 40 thus allowing each of the channels 30 formed in panel 10 to fill with an exact amount of adhesive 50 thereby avoiding the aforementioned under- or over-filling of each of the channels 30 when panels 10, 20 are pressed together in a bonding fixtures to form an adhesive bond. Thus, the panel assembly and method of adhesively bonding the panel assembly provides the panels 10, 20 with an overall bond strength and minimized defects in appearance.

In yet a further embodiment, a panel for an automotive vehicle body structure comprises at least one channel 30 defined therein and at least one modified branched channel 40 in fluid communication with the at least one channel 30. In this embodiment, (as well as the aforementioned embodiments), the inner panel 10 and outer panel 20 may comprise one or more materials, including but not limited to plastic and composite materials. More specifically, the inner panel 10 and outer panel 20 may comprise, but not limited to, thermoset composite materials such as sheet molding compound (SMC) or reaction injection molded urethane (RIM); or thermoplastic molding plastic materials such as polycarbonate+polybutylene terephthalate (PC+PBT) or polyamide+polyphenylene ethoxide (PA+PPE). More specifically, the inner panel 10 and outer panel 20 are used for, but not limited to, automotive vehicle body structures including spoilers, closure panels, fenders, and the like that have complementary inner and outer panels that are joined at peripheral surfaces.

The at least one channel 30 may comprise dimensions, including but not limited to, a width in the range of between about 5 to about 12 mm and a depth in the range of between about 0.5 mm to about 2.5 mm. The modified branched channels 40 are typically half as wide as the main channel 30 and tapered in the depth dimension so that they are wider at the entrance 40A adjacent the main channel 30 than at the remote end 40B. These modified branched channels 40 may comprise dimensions, including but not limited to, a width in the range of between about 2.5 to about 6 mm.

In general suitable materials for the adhesive 50 include, but are not limited to, a two component epoxy, urethane and acrylic adhesives. These adhesives are applied in a thixotropic liquid form and cured to a solid state following the application of heat.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. An automotive panel, comprising:
   at least one main adhesive channel defined therein; and
   at least one branched adhesive channel spaced sequentially along a linear dimension of said at least one main adhesive channel and in fluid communication with said at least one main adhesive channel such that upon placement of an adhesive into said at least one main adhesive channel and joining said automotive panel to another structure, an excess of said adhesive flows into said at least one branched adhesive channel.

2. The panel of claim 1, wherein said panel is a plastic panel.

3. The panel of claim 1, wherein said at least one main adhesive channel traverses a substantial majority of at least one of the length and width of said panel.

4. The panel of claim 1, wherein said at least one branched adhesive channel being smaller in dimension than said at least one main adhesive channel.

5. The panel of claim 4, wherein the width of said at least one branched adhesive channel is in the range of between about 2.5 to about 6 mm.

6. The panel of claim 5, wherein said at least one branched adhesive channel is tapered to be wider at an entrance adjacent said at least one main channel than at a remote end thereof.

7. The panel of claim 1, wherein said at least one main adhesive channel comprises a plurality of said at least one branched adhesive channel angled sequentially along a linear dimension of said at least one main adhesive channel.

8. An automotive panel assembly, comprising:
   a first panel and a second panel;
   at least one main adhesive channel formed in at least one of said first and second panels;
   at least one branched adhesive channel spaced sequentially along a linear dimension of said at least one main adhesive channel and in fluid communication with said at least one main adhesive channel; and
   an adhesive for joining said first and second panels to form an adhesive bond therebetween such that upon placement of said adhesive into said at least one main adhesive channel and joining said first panel to said second panel, an excess of said adhesive flows into said at least one branched adhesive channel.

9. The panel assembly of claim 8, wherein said first and second panels are plastic panels.

10. The panel assembly of claim 8, wherein said adhesive is a two component epoxy.

11. The panel assembly of claim 8, wherein said at least one main adhesive channel traverses a substantial majority of at least one of the length and width of said first and second panels.

12. The panel assembly of claim 8, wherein said at least one branched adhesive channel being smaller in dimension than said at least one main adhesive channel.

13. The panel assembly of claim 12, wherein the width of said at least one branched adhesive channel is in the range of between about 2.5 to about 6 mm.

14. The panel assembly of claim 13, wherein said at least one branched adhesive channel is tapered to be wider at an entrance adjacent said at least one main channel than at a remote end thereof.

15. The panel assembly of claim 8, wherein one of said first and second panels defines an inner panel and the other of said first and second panels defines an outer panel.

16. The panel assembly of claim 8, wherein said at least one main adhesive channel comprises a plurality of said at least one branched adhesive channel angled sequentially along a linear dimension of said at least one main adhesive channel.

17. A method of adhesively bonding an automotive panel assembly, said method comprising:
   providing a first panel and a second panel, wherein at least one of said first and second panels comprises at least one main adhesive channel and at least one branched adhesive channel formed therein, wherein said at least one branched adhesive channel is spaced sequentially along a linear dimension of said at least one main adhesive channel and in fluid communication with said at least one main adhesive channel to act as an overflow outlet;
   inserting an adhesive into said at least one main adhesive channel; and
   pressing said first and said second panels together to form an adhesive bond such that any excess of said adhesive flows from said at least one main adhesive channel to said overflow outlet.

18. The method of claim 17, wherein said at least one main adhesive channel traverses a substantial majority of at least one of the length and width of said first and second panels.

* * * * *